US010440656B2

(12) United States Patent
Fan et al.

(10) Patent No.: US 10,440,656 B2
(45) Date of Patent: Oct. 8, 2019

(54) METHOD AND TERMINAL DEVICE FOR ADAPTING TRANSMISSION POWER

(71) Applicant: Telefonaktiebolaget LM Ericsson (publ), Stockholm (SE)

(72) Inventors: Rui Fan, Beijing (CN); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 87 days.

(21) Appl. No.: 15/515,702

(22) PCT Filed: Jan. 5, 2017

(86) PCT No.: PCT/CN2017/070273
§ 371 (c)(1),
(2) Date: Mar. 30, 2017

(87) PCT Pub. No.: WO2018/126394
PCT Pub. Date: Jul. 12, 2018

(65) Prior Publication Data
US 2018/0332539 A1 Nov. 15, 2018

(51) Int. Cl.
*H04W 52/16* (2009.01)
*H04W 52/14* (2009.01)
(Continued)

(52) U.S. Cl.
CPC ....... *H04W 52/146* (2013.01); *H04W 52/281* (2013.01); *H04W 52/346* (2013.01); *H04W 52/367* (2013.01)

(58) Field of Classification Search
CPC ............. H04W 52/146; H04W 52/281; H04W 52/346; H04W 52/367
(Continued)

(56) References Cited

U.S. PATENT DOCUMENTS 6,625,117 B1 * 9/2003 Chen .................. H04L 1/22
370/227
9,629,094 B2 * 4/2017 Damnjanovic ....... H04W 52/04
(Continued)

FOREIGN PATENT DOCUMENTS

CN 103889041 A 6/2014
WO 2016 022211 A1 2/2016

OTHER PUBLICATIONS

PCT Notification of Transmittal of the International Search Report and the Written Opinion of the International Searching Authority, or the Declaration for International application No. PCT/CN2017/070273—dated Sep. 26, 2017.
(Continued)

*Primary Examiner* — Hai V Nguyen
(74) *Attorney, Agent, or Firm* — Baker Botts, LLP (57) ABSTRACT

The present disclosure provides a method (100) in a terminal device for adapting transmission power among two or more physical uplink channels. The method (100) comprises: identifying (S110) at least one physical uplink channel carrying Ultra-Reliable and Low-Latency Communications (URLLC) related data, from the two or more physical uplink channels; prioritizing (S120) the at least one physical uplink channel over at least one physical uplink channel not carrying URLLC related data of the two or more physical uplink channels; and adapting (S130) transmission power of the two or more physical uplink channels based on the prioritizing, such that the total transmission power of the two or more physical uplink channels does not exceed the maximum transmission power at the terminal device.

23 Claims, 5 Drawing Sheets

(51) Int. Cl.
*H04W 52/28* (2009.01)
*H04W 52/34* (2009.01)
*H04W 52/36* (2009.01)

(58) Field of Classification Search
USPC .................................................. 455/522, 512
See application file for complete search history.

(56) References Cited

U.S. PATENT DOCUMENTS

| | | | | |
|---|---|---|---|---|
| 10,104,695 | B2* | 10/2018 | Yang | H04L 27/0008 |
| 10,251,172 | B2* | 4/2019 | Abedini | H04W 24/02 |
| 2013/0051297 | A1* | 2/2013 | Kim | H04W 52/146 |
| | | | | 370/311 |
| 2014/0211647 | A1* | 7/2014 | Li | H04W 24/10 |
| | | | | 370/252 |
| 2015/0271761 | A1 | 9/2015 | Park | |
| 2017/0265229 | A1* | 9/2017 | Yang | H04L 27/0008 |
| 2017/0310431 | A1* | 10/2017 | Iyer | H04L 1/1816 |
| 2017/0332359 | A1* | 11/2017 | Tsai | H04B 7/0617 |
| 2017/0366311 | A1* | 12/2017 | Iyer | H04B 7/0482 |
| 2017/0367116 | A1* | 12/2017 | Li | H04W 74/08 |
| 2018/0019843 | A1* | 1/2018 | Papasakellariou | H04L 1/1822 |
| 2018/0035446 | A1* | 2/2018 | Li | H04L 5/14 |
| 2018/0035455 | A1* | 2/2018 | Xu | H04L 5/0048 |
| 2018/0035459 | A1* | 2/2018 | Islam | H04L 1/16 |
| 2018/0063834 | A1* | 3/2018 | Abedini | H04W 24/02 |
| 2018/0063835 | A1* | 3/2018 | Abedini | H04W 24/02 |
| 2018/0091267 | A1* | 3/2018 | Kim | H04L 27/2602 |
| 2018/0115363 | A1* | 4/2018 | Abedini | H04B 7/0426 |
| 2018/0115940 | A1* | 4/2018 | Abedini | H04W 74/006 |
| 2018/0115990 | A1* | 4/2018 | Abedini | H04W 74/006 |
| 2018/0124710 | A1* | 5/2018 | Ly | H04L 5/0007 |
| 2018/0132140 | A1* | 5/2018 | Yoo | H04W 16/14 |
| 2018/0132189 | A1* | 5/2018 | Sundararajan | H04W 52/50 |
| 2018/0132264 | A1* | 5/2018 | Jung | H04L 1/1854 |
| 2018/0139773 | A1* | 5/2018 | Ma | H04W 72/0453 |
| 2018/0167164 | A1* | 6/2018 | Lin | H04L 1/00 |
| 2018/0167848 | A1* | 6/2018 | Lei | H04W 28/26 |
| 2018/0167965 | A1* | 6/2018 | Wang | H04L 1/0006 |
| 2018/0184431 | A1* | 6/2018 | Li | H04W 72/042 |
| 2018/0184444 | A1* | 6/2018 | Li | H04W 72/1252 |
| 2018/0192416 | A1* | 7/2018 | Yin | H04W 72/0413 |
| 2018/0192417 | A1* | 7/2018 | Yin | H04W 72/0413 |
| 2018/0198204 | A1* | 7/2018 | Kovacic | H01Q 3/36 |
| 2018/0220414 | A1* | 8/2018 | Yin | H04W 72/0413 |
| 2018/0220415 | A1* | 8/2018 | Yin | H04W 72/0413 |
| 2018/0227961 | A1* | 8/2018 | Mallick | H04W 76/27 |
| 2018/0227962 | A1* | 8/2018 | Mallick | H04W 76/27 |
| 2019/0014596 | A1* | 1/2019 | Yang | H04W 72/0446 |
| 2019/0089498 | A1* | 3/2019 | Pelletier | H04L 5/003 |

OTHER PUBLICATIONS

European Patent Office Communication re Application 17890105,4-1219 PCT/CN2017/070273.

European Patent Office Communication re Application No. 117890105.4-1219 PCT/CN2017/070273—dated Aug. 26, 2010.

* cited by examiner

PRIORITIZING A UPLINK PHYSICAL DATA CHANNEL CARRYING URLLC RELATED DATA OVER ANOTHER UPLINK PHYSICAL DATA CHANNEL NOT CARRYING URLLC — S123

PRIORITIZING A UPLINK PHYSICAL DATA CHANNEL CARRYING URLLC RELATED DATA OVER A UPLINK PHYSICAL CONTROL CHANNEL NOT CARRYING URLLC — S124

SETTING A MINIMUM TRANSMISSION POWER FOR EACH PHYSICAL UPLINK CHANNEL OF THE TWO OR MORE PHYSICAL UPLINK CHANNELS, SUCH THAT TRANSMISSION POWER OF THE PHYSICAL UPLINK CHANNEL KEEPS ABOVE THE MINIMUM TRANSMISSION POWER — S131

METHOD AND TERMINAL DEVICE FOR ADAPTING TRANSMISSION POWER

PRIORITY

This nonprovisional application is a U.S. National Stage Filing under 35 U.S.C. § 371 of International Patent Application Serial No. PCT/CN2017/070273 filed Jan. 5, 2017, and entitled "Method And Terminal Device For Adapting Transmission Power."

TECHNICAL FIELD

The present disclosure relates to communication technology, and more particularly, to a method and a terminal device for adapting transmission power among two or more physical uplink channels.

BACKGROUND

In Long-Term Evolution (LTE), in uplink, when the total power required by different physical uplink channels is beyond the User Equipment (UE) maximum transmission power, power scaling is needed. The rules about how to do power scaling across different physical uplink channels or even across different nodes can be summarized as below.

For Carrier Aggregation (CA), due to multiple Physical Uplink Shared CHannel (PUSCH) transmissions and simultaneous PUSCH and Physical Uplink Control CHannel (PUCCH) transmissions, the available transmit power may be insufficient for a UE. When the total required transmission power exceeds the maximum allowed UE transmission power, UL power scaling shall be applied to reduce the total transmission power to fall below the maximum allowed UE transmission power. Currently in LTE, the power scaling priority rules are as following when there are multiple physical uplink channels:

when there are PUCCH and PUSCH with Uplink Control Information (UCI), the PUSCH shall be scaled firstly;
when there are PUSCH with UCI and PUSCH without UCI, the latter shall be scaled firstly;
when there are multiple PUSCHs without UCI, these PUSCHs are scaled equally (i.e. with equal priority).

For dual connectivity, two different designs have been done, for uplink power control design, based on what level of synchronization the UE can assume between the Master evolved NodeB (MeNB) and Secondary eNB (SeNB), according to the above aspects. This may be translated into two Power Control Modes (PCMs), i.e., PCM1 that can handle synchronization level up to mode 1 and PCM2 that can handle synchronization level up to mode 2.

DC power control mode 1 (PCM1) refers to the following power control behavior:
The power is distributed among PUSCH/PUCCH and across cell groups (CG) in the same manner as for CA within Release 11. With the exception that if the same UCI type collides, the transmission power of physical uplink channels of Secondary Cell Group (SCG) shall be scaled first before scaling the transmission power for physical uplink channels of Master Cell Group (MCG).

DC power control mode 2 (PCM2) refers to the following power control behavior:
Since there can be a timing difference between two connectivity's, power scaling shall be performed for the physical uplink channels of the connectivity with later transmission timing over the air.

For the $5^{th}$ Generation (5G) network or the New Radio (NR), it is supposed to support multiple types of services using common Radio Access Network (RAN), including, but not limited to, enhanced Mobile BroadBand (eMBB), massive Machine Type Communication (mMTC) and Ultra-Reliable and Low Latency Communication (URLLC). These services require different Quality-of-Services (QoS), e.g., delay, data rate and packet loss rate.

To be specific, URLLC is a category of services defined in 3GPP TR 22.862, Version 14.1.0. For URLLC services, both high reliability and low latency are required. But, URLLC usually has very low data rate and possibly sparse data transmission. For mMTC services, long battery lifetime is typically required, but low delay or high data rate is not required, often combined with small infrequent packets. For eMBB services, high data rate is required, and delay can be strict but typically less strict than that in URLLC services.

For URLLC services, the typical view is that one could not rely much on the Automatic Repeat request (ARQ) protocol to enhance the data transmission reliability and the residual Hybrid Automatic Repeat reQuest (HARQ) BLock Error Rate (BLER) shall be low in order to meet the QoS requirement.

The problem with LTE like power sharing solution is that it does not care about differences among upper layer services. Each PUSCH channel always has a lower priority than each PUCCH channel. And, PUSCH channels carrying pure user data (no UCI) are always treated equally. This is not a problem in LTE as the service provided by LTE is Mobile BroadBand (MBB). However, in NR, a UE can support different slices concurrently, e.g., URLLC and eMBB or mMTC. When the UE is power limited, equal power scaling on URLLC and eMBB is not a good choice as URLLC definitely has higher QoS requirements than eMBB.

SUMMARY

It is an object of the present disclosure to provide a method and a terminal device for adapting transmission power among two or more physical uplink channels, capable of guaranteeing the quality of certain type of services having high QoS requirements, especially URLLC services, even when UE is power limited.

In a first aspect, a method in a terminal device for adapting transmission power among two or more physical uplink channels is provided. The method comprises: identifying at least one physical uplink channel carrying URLLC related data, from the two or more physical uplink channels; prioritizing the at least one physical uplink channel over at least one physical uplink channel not carrying URLLC related data of the two or more physical uplink channels; and adapting transmission power of the two or more physical uplink channels based on the prioritizing, such that the total transmission power of the two or more physical uplink channels does not exceed the maximum transmission power at the terminal device.

In an embodiment, the prioritizing comprises: prioritizing a uplink physical control channel carrying URLLC related data over a uplink physical data channel carrying URLLC.

In an embodiment, the prioritizing comprises: prioritizing a uplink physical control channel carrying URLLC related data over another uplink physical control channel not carrying URLLC.

In an embodiment, the prioritizing comprises: prioritizing a uplink physical data channel carrying URLLC related data over another uplink physical data channel not carrying URLLC.

In an embodiment, the prioritizing comprises: prioritizing a uplink physical data channel carrying URLLC related data over a uplink physical control channel not carrying URLLC.

In an embodiment, the adjusting comprises: setting a minimum transmission power for each physical uplink channel of the two or more physical uplink channels, such that transmission power of the physical uplink channel keeps above the minimum transmission power.

In an embodiment, the identifying comprises: determining from Radio Resource Control (RRC) signaling that at least one logical channel is only allowed to transmit over some carrier or cell; and identifying at least one uplink channel on the carrier or cell as carrying URLLC related data.

In an embodiment, the identifying comprises: determining from Radio Resource Control (RRC) signaling that at least one logical channel is only allowed to transmit over a specific numerology with low delay; and identifying at least one physical uplink channel which is mapped to the specific numerology as carrying URLLC related data.

In an embodiment, the identifying comprises: determining from RRC signaling that at least one logical channel is only allowed to transmit over a Transmission Time Interval (TTI) length less than a predetermined number of Orthogonal Frequency Division Multiplexing (OFDM) symbols; and identifying at least one physical uplink channel which is mapped to the TTI length as carrying URLLC related data.

In an embodiment, the identifying further comprises: determining from Layer one (L1) grant that a BLER target bundled to the grant is less than the normal BLER target; and identifying at least one physical uplink channel using the grant as carrying URLLC related data.

In an embodiment, the at least one physical uplink channel carrying URLLC related data is predefined according to physical resources that the at least one physical uplink channel is mapped to.

In an embodiment, the two or more physical uplink channels comprise a PUCCH and/or one or more PUSCHs.

In a second aspect, a terminal device for adapting transmission power among two or more physical uplink channels is provided. The terminal device comprises: an identifying unit configured to identify at least one physical uplink channel carrying URLLC related data, from the two or more physical uplink channels; a prioritizing unit configured to prioritize the at least one physical uplink channel over at least one physical uplink channel not carrying URLLC related data of the two or more physical uplink channels; and an adapting unit configured to adapt transmission power of the two or more physical uplink channels based on the prioritizing, such that the total transmission power of the two or more physical uplink channels does not exceed the maximum transmission power at the terminal device.

In a third aspect, a terminal device is provided for adapting transmission power among two or more physical uplink channels. The terminal device comprises a transceiver, a processor and a memory. The memory contains instructions executable by the processor whereby the terminal device is operative to perform the method of the first aspect.

The above embodiments of the first aspect are also applicable for the second and third aspects.

With the embodiments of the present disclosure, URLLC is prioritized over eMBB or mMTC. To be specific, when the total required transmission power exceeds the maximum allowed UE transmission power, power scaling is performed for physical uplink channels carrying eMBB/eMTC services, before power scaling is performed for physical uplink channels carrying URLLC services. Thereby, the quality of URLLC services can be guaranteed even when UE is power limited.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be noted that the following embodiments are illustrative only, rather than limiting the scope of the disclosure.

Figure 1:
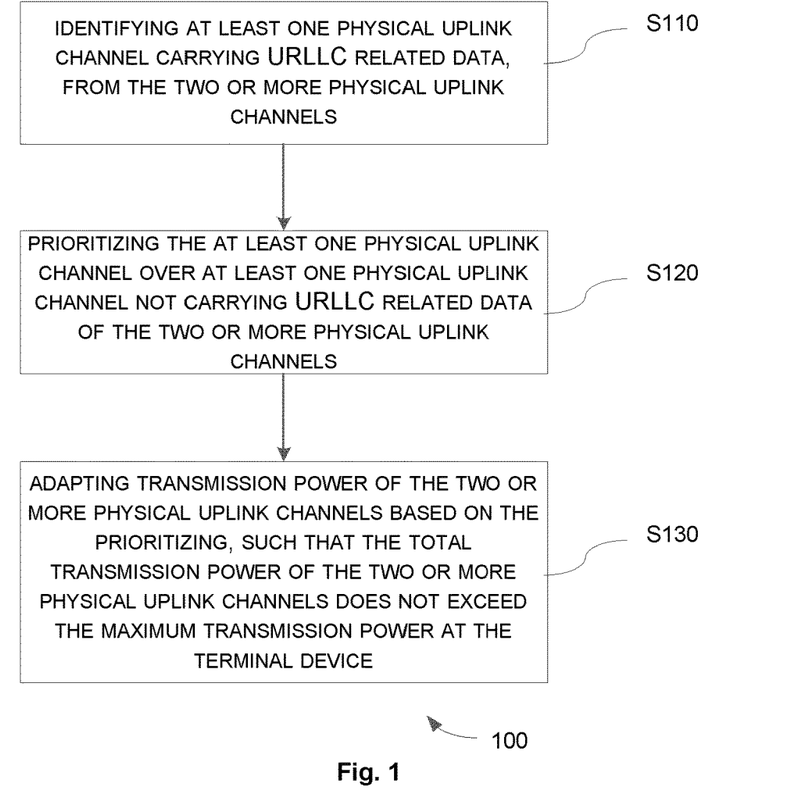
FIGS. 1-10 show flowcharts illustrating a method 100 for adapting transmission power among two or more physical uplink channels according to embodiments of the present disclosure.

FIG. 1 is a flowchart illustrating a method 100 for adapting transmission power among two or more physical uplink channels according to an embodiment of the present disclosure. The method 100 can be performed at a terminal device, e.g., a UE.

For example, the two or more physical uplink channels may comprise a PUCCH and/or one or more PUSCHs.

At step S110, the terminal device identifies at least one physical uplink channel carrying URLLC related data, from the two or more physical uplink channels.

Generally, UE physical layer should not know which service/slice is mapped to which physical uplink channel. However, UE physical layer can derive such information by some restriction or mapping information for each logical channel. This is feasible according to the latest agreement in RAN2 as below:

gNB (name of base station for 5G) should have means to control which logical channels the UE may map to which numerology and/or TTIs with variable duration. Details FFS (e.g. whether semi-static or dynamic, hard split/soft split, etc.)

According to the present disclosure, the restriction or mapping may include static mapping using some RRC signaling and dynamic mapping using L1 grant. This will be further explained with reference to the following implementations.

Figure 2:
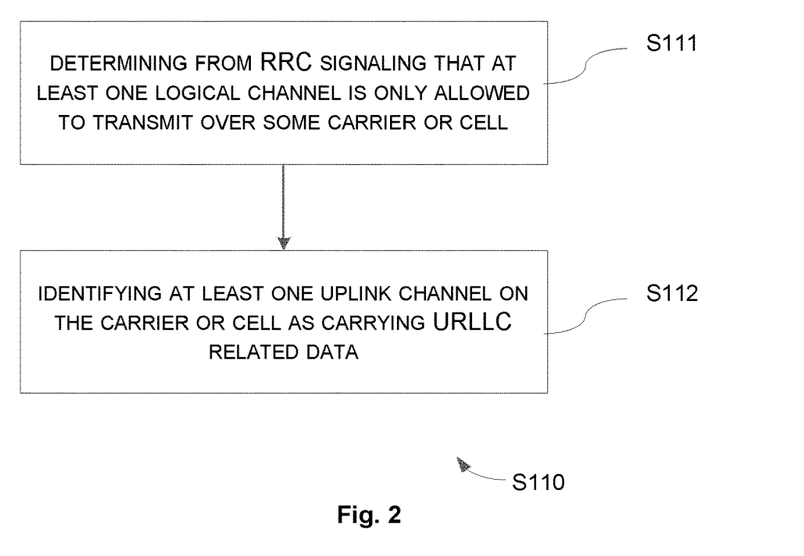

In an implementation, the identifying at step S110 may be implemented as shown in FIG. 2.

At step S111, the terminal device determines from RRC signaling that at least one logical channel is only allowed to transmit over some carrier or cell.

At step S112, the terminal device identifies at least one uplink channel on the carrier or cell as carrying URLLC related data.

Figure 3:
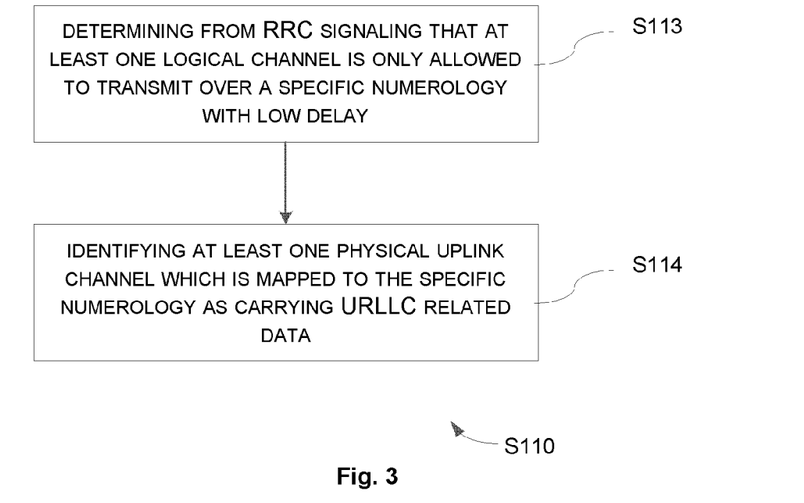

In another implementation, the identifying at step S110 may be implemented as shown in FIG. 3.

At step S113, the terminal device determines from RRC signaling that at least one logical channel is only allowed to transmit over a specific numerology with low delay.

At step S114, the terminal device identifies at least one physical uplink channel which is mapped to the specific numerology as carrying URLLC related data.

Figure 4:
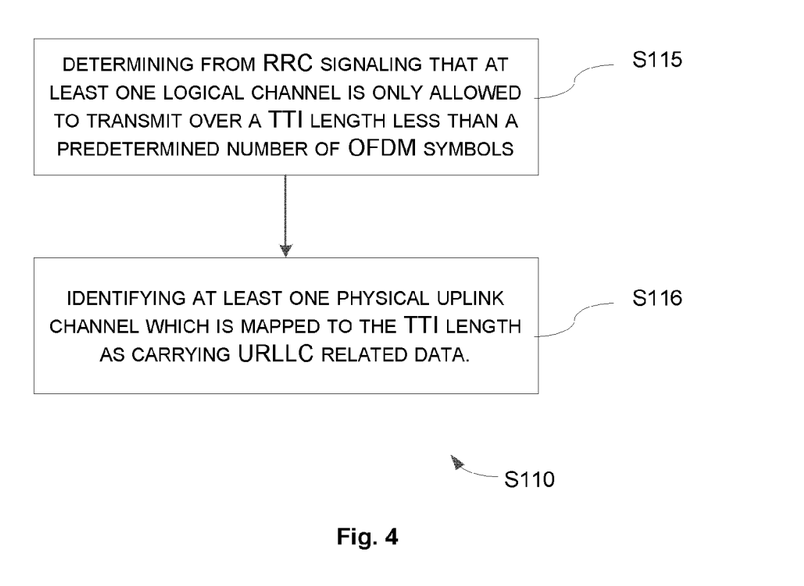

In yet another implementation, the identifying at step S110 may be implemented as shown in FIG. 4.

At step S115, the terminal device determines from RRC signaling that at least one logical channel is only allowed to transmit over a TTI length less than a predetermined number of OFDM symbols.

At step S116, the terminal device identifies at least one physical uplink channel which is mapped to the TTI length as carrying URLLC related data.

Figure 5:
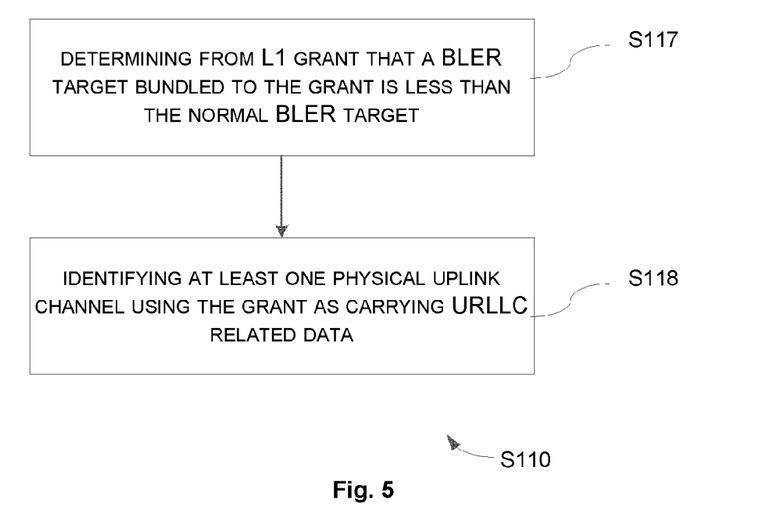

In a further implementation, the identifying at step S110 may be implemented as shown in FIG. 5.

At step S117, the terminal device determines from L1 grant that a BLER target bundled to the grant is less than the normal BLER target.

At step S118, the terminal device identifies at least one physical uplink channel using the grant as carrying URLLC related data.

In another implementation, the at least one physical uplink channel carrying URLLC related data is predefined according to physical resources that the at least one physical uplink channel is mapped to. In this case, UE should clearly know which physical uplink channel is for which service/slice, and thus can identify which physical uplink channel(s) carries URLLC related data, and which physical uplink channel(s) carries eMBB or mMTC related data.

Return to FIG. 1, the method 100 proceeds with step S120.

At step S120, the terminal device prioritizes the at least one physical uplink channel over at least one physical uplink channel not carrying URLLC related data of the two or more physical uplink channels.

For example, if the PUSCH/PUCCH which has higher probability to carry URLLC traffic is identified, then power scaling can be done when the total required transmission power exceeds the maximum allowed UE transmission power. There are two exemplary rules for the power scaling as follows.

Rule 1: physical uplink channels corresponding to URLLC are prioritized over physical uplink channels not related to URLLC. The priority descending order can be:
PUCCH carrying URLLC
PUSCH carrying URLLC
PUCCH carrying other service
PUSCH carrying other service Rule 2: PUSCH corresponding to URLLC is prioritized over PUSCH not related to URLLC. But, PUCCH is always prioritized over PUSCH.
PUCCH carrying URLLC
PUCCH carrying other service
PUSCH carrying URLLC data
PUSCH carrying other service data These two rules will be further explained with reference to the following implementations.

Figure 6:
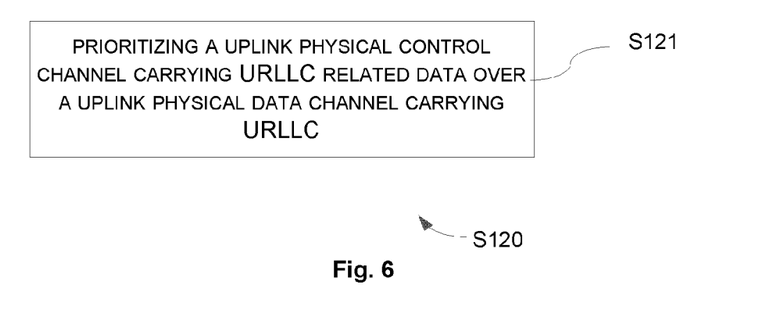

In an implementation, step S120 may be implemented as shown in FIG. 6.

At step S121, the terminal device prioritizes a uplink physical control channel carrying URLLC related data over a uplink physical data channel carrying URLLC.

Figure 7:
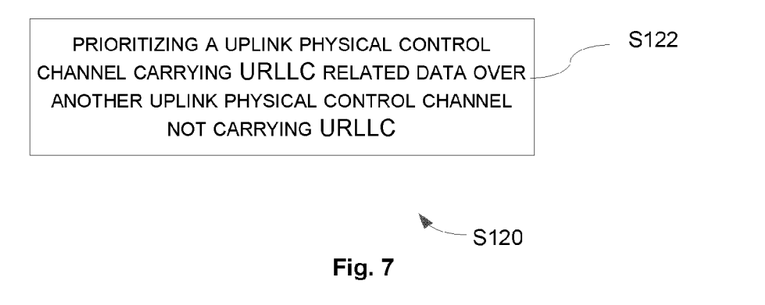

In an implementation, step S120 may be implemented as shown in FIG. 7.

At step S122, the terminal device prioritizes a uplink physical control channel carrying URLLC related data over another uplink physical control channel not carrying URLLC.

Figure 8:
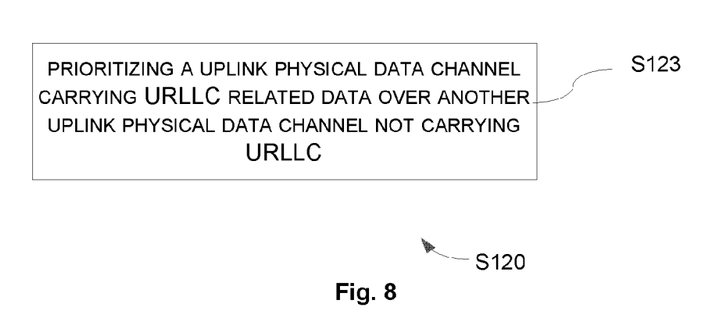

In an implementation, step S120 may be implemented as shown in FIG. 8.

At step S123, the terminal device prioritizes a uplink physical data channel carrying URLLC related data over another uplink physical data channel not carrying URLLC.

Figure 9:
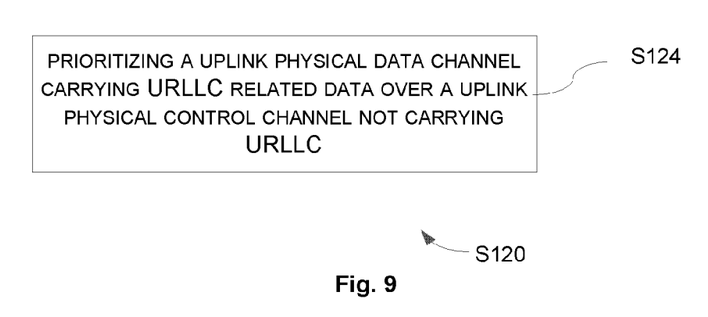

In an implementation, step S120 may be implemented as shown in FIG. 9.

At step S124, the terminal device prioritizes a uplink physical data channel carrying URLLC related data over a uplink physical control channel not carrying URLLC.

The method 100 further comprises step S130. At step S130, the terminal device adapts transmission power of the two or more physical uplink channels based on the prioritizing, such that the total transmission power of the two or more physical uplink channels does not exceed the maximum transmission power at the terminal device.

In an embodiment, power scaling thresholds can be configured to each physical uplink channel. The power scaling thresholds can be either physical uplink channel specific or the same for all physical uplink channels. Only when transmission power of a physical uplink channel is scaled down to the threshold, power scaling of a physical uplink channel with a higher priority can be performed.

In another embodiment, the priority order for power scaling can be either predefined or preconfigured via RRC signaling. The configured priority shall override the default priority order.

In a further embodiment, a terminal device may configure the UE to report the power scaling to the network side according to certain preconfigured rules. For instance, the UE may be configured to report the power scaling information when the power scaling is performed for PUCCH or PUSCH for URLLC services.

Figure 10:
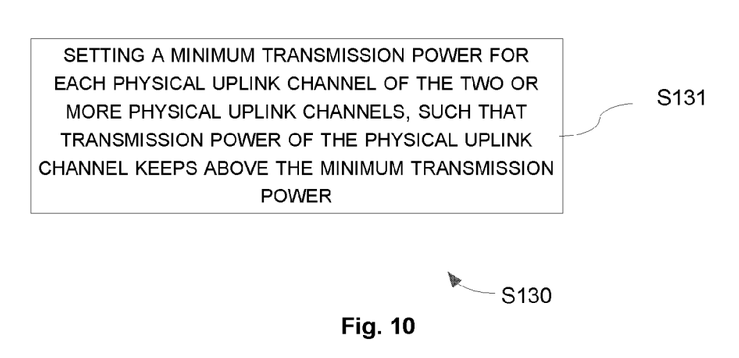

In an implementation, step S130 may be implemented as shown in FIG. 10.

At step S131, the terminal device sets a minimum transmission power for each physical uplink channel of the two or more physical uplink channels, such that transmission power of the physical uplink channel keeps above the minimum transmission power.

With the method 100, by prioritizing URLLC over eMBB or mMTC, the quality of URLLC services can be guaranteed even when UE is power limited.

Figure 11:
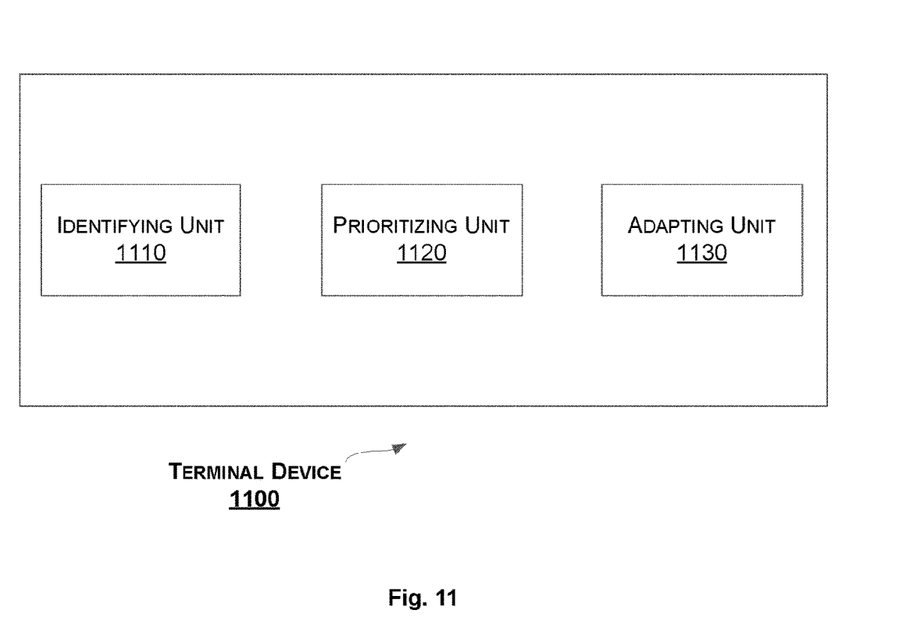
FIG. 11 is a block diagram of a terminal device 1100 for adapting transmission power among two or more physical uplink channels according to an embodiment of the present disclosure.

Correspondingly to the method 100 as described above, a terminal device is provided. FIG. 11 is a block diagram of a terminal device 1100 for adapting transmission power among two or more physical uplink channels according to an embodiment of the present disclosure. The terminal device 1100 can be e.g., a UE.

For example, the two or more physical uplink channels comprise a PUCCH and/or one or more PUSCHs.

As shown in FIG. 11, the terminal device 1100 comprises an identifying unit 1110, a prioritizing unit 1120, and an adaption unit 1130.

The identifying unit 1110 is configured to identify at least one physical uplink channel carrying URLLC related data, from the two or more physical uplink channels.

In an embodiment, the identifying unit 1110 is further configured to: determine from RRC signaling that at least one logical channel is only allowed to transmit over some carrier or cell; and identify at least one uplink channel on the carrier or cell as carrying URLLC related data.

In another embodiment, the identifying unit 1110 is further configured to: determine from RRC signaling that at least one logical channel is only allowed to transmit over a specific numerology with low delay; and identify at least one physical uplink channel which is mapped to the specific numerology as carrying URLLC related data.

In yet another embodiment, the identifying unit 1110 is further configured to: determine from RRC signaling that at least one logical channel is only allowed to transmit over a TTI length less than a predetermined number of OFDM symbols; and identify at least one physical uplink channel which is mapped to the TTI length as carrying URLLC related data.

In still another embodiment, the identifying unit 1110 is further configured to: determine from L1 grant that a BLER target bundled to the grant is less than the normal BLER target; and identify at least one physical uplink channel using the grant as carrying URLLC related data.

In a further embodiment, the at least one physical uplink channel carrying URLLC related data is predefined according to physical resources that the at least one physical uplink channel is mapped to.

The prioritizing unit 1120 is configured to prioritize the at least one physical uplink channel over at least one physical uplink channel not carrying URLLC related data of the two or more physical uplink channels.

In an embodiment, the prioritizing unit 1120 is further configured to: prioritize a uplink physical control channel carrying URLLC related data over a uplink physical data channel carrying URLLC.

In another embodiment, the prioritizing unit 1120 is further configured to: prioritize a uplink physical control channel carrying URLLC related data over another uplink physical control channel not carrying URLLC.

In yet another embodiment, the prioritizing unit 1120 is further configured to: prioritize a uplink physical data channel carrying URLLC related data over another uplink physical data channel not carrying URLLC.

In still another embodiment, the prioritizing unit 1120 is further configured to: prioritizing a uplink physical data channel carrying URLLC related data over a uplink physical control channel not carrying URLLC.

The adapting unit 1130 is configured to adapt transmission power of the two or more physical uplink channels based on the prioritizing, such that the total transmission power of the two or more physical uplink channels does not exceed the maximum transmission power at the terminal device.

In an embodiment, the adapting unit 1130 is further configured to set a minimum transmission power for each physical uplink channel of the two or more physical uplink channels, such that transmission power of the physical uplink channel keeps above the minimum transmission power.

Each of the units 1110-1130 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIGS. 1-10.

Figure 12:
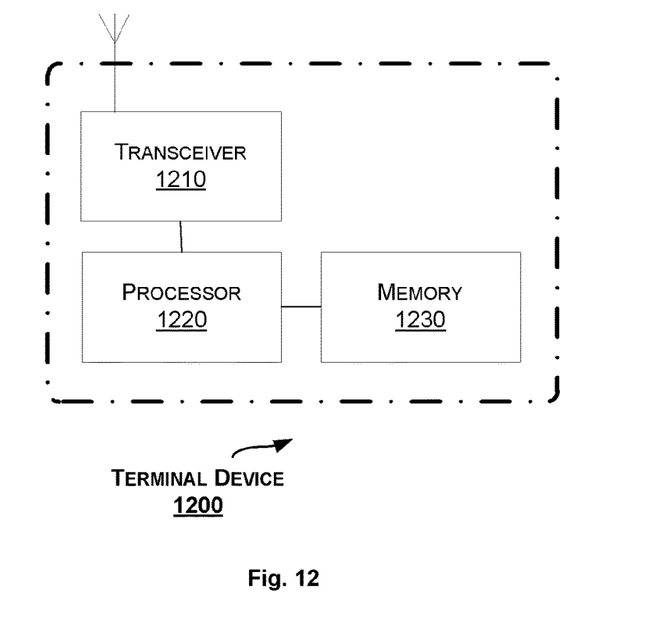
FIG. 12 is a block diagram of a terminal device 1200 according to another embodiment of the present disclosure.

FIG. 12 is a block diagram of a terminal device 1200 according to another embodiment of the present disclosure.

The terminal device 1200 can be provided for adapting transmission power among two or more physical uplink channels. The terminal device 1200 includes a transceiver 1210, a processor 1220 and a memory 1230. The memory 1230 contains instructions executable by the processor 1220 whereby the terminal device 1200 is operative to: identify at least one physical uplink channel carrying URLLC related data, from the two or more physical uplink channels; prioritize the at least one physical uplink channel over at least one physical uplink channel not carrying URLLC related data of the two or more physical uplink channels; and adapt transmission power of the two or more physical uplink channels based on the prioritizing, such that the total transmission power of the two or more physical uplink channels does not exceed the maximum transmission power at the terminal device.

The present disclosure also provides at least one computer program product in the form of a non-volatile or volatile memory, e.g., an Electrically Erasable Programmable Read-Only Memory (EEPROM), a flash memory and a hard drive. The computer program product includes a computer program. The computer program includes: code/computer readable instructions, which when executed by the processor 1220 causes the terminal device 1200 to perform the actions, e.g., of the procedure described earlier in conjunction with FIGS. 1-10.

The computer program product may be configured as a computer program code structured in computer program modules. The computer program modules could essentially perform the actions of the flow illustrated in FIGS. 1-10.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a terminal device for adapting transmission power among two or more physical uplink channels, comprising:
   identifying at least one physical uplink channel carrying Ultra-Reliable and Low-Latency Communications, URLLC, related data, from the two or more physical uplink channels;
   prioritizing the at least one physical uplink channel over at least one physical uplink channel not carrying URLLC related data of the two or more physical uplink channels, wherein the prioritizing comprises prioritizing an uplink physical control channel carrying URLLC related data over an uplink physical data channel carrying URLLC related data; and
   adapting transmission power of the two or more physical uplink channels based on the prioritizing, such that the total transmission power of the two or more physical uplink channels does not exceed the maximum transmission power at the terminal device.

2. The method of claim 1, wherein the prioritizing comprises:
prioritizing a uplink physical control channel carrying URLLC related data over another uplink physical control channel not carrying URLLC.

3. The method of claim 1, wherein the prioritizing comprises:
prioritizing a uplink physical data channel carrying URLLC related data over another uplink physical data channel not carrying URLLC.

4. The method of claim 1, wherein the prioritizing comprises:
prioritizing a uplink physical data channel carrying URLLC related data over a uplink physical control channel not carrying URLLC.

5. The method of claim 1, wherein the adjusting comprises:
setting a minimum transmission power for each physical uplink channel of the two or more physical uplink channels, such that transmission power of the physical uplink channel keeps above the minimum transmission power.

6. The method of claim 1, wherein the identifying comprises:
determining from Radio Resource Control, RRC, signaling that at least one logical channel is only allowed to transmit over some carrier or cell; and
identifying at least one uplink channel on the carrier or cell as carrying URLLC related data.

7. The method of claim 1, wherein the identifying comprises:
determining from Radio Resource Control, RRC, signaling that at least one logical channel is only allowed to transmit over a specific numerology with low delay; and
identifying at least one physical uplink channel which is mapped to the specific numerology as carrying URLLC related data.

8. The method of claim 1, wherein the identifying comprises:
determining from Radio Resource Control, RRC, signaling that at least one logical channel is only allowed to transmit over a Transmission Time Interval, TTI, length less than a predetermined number of Orthogonal Frequency Division Multiplexing, OFDM, symbols; and
identifying at least one physical uplink channel which is mapped to the TTI length as carrying URLLC related data.

9. The method of claim 1, the identifying further comprises:
determining from Layer one, L1, grant that a BLock Error Rate, BLER, target bundled to the grant is less than the normal BLER target; and
identifying at least one physical uplink channel using the grant as carrying URLLC related data.

10. The method of claim 1, wherein the at least one physical uplink channel carrying URLLC related data is predefined according to physical resources that the at least one physical uplink channel is mapped to.

11. The method of claim 1, wherein the two or more physical uplink channels comprise a Physical Uplink Control CHannel, PUCCH, and/or one or more Physical Uplink Shared CHannels, PUSCHs.

12. A terminal device for adapting transmission power among two or more physical uplink channels, comprising:
at least one processor; and
at least one memory that stores processor-executable instructions that, when executed by the processor, causes a terminal device to:
identify at least one physical uplink channel carrying Ultra-Reliable and Low-Latency Communications, URLLC, related data, from the two or more physical uplink channels;
prioritize the at least one physical uplink channel over at least one physical uplink channel not carrying URLLC related data of the two or more physical uplink channels, wherein the prioritizing comprises prioritizing an uplink physical control channel carrying URLLC related data over an uplink physical data channel carrying URLLC related data; and
adapt transmission power of the two or more physical uplink channels based on the prioritizing, such that the total transmission power of the two or more physical uplink channels does not exceed the maximum transmission power at the terminal device.

13. The terminal device of claim 12, wherein the instructions further cause the terminal device to:
prioritize a uplink physical control channel carrying URLLC related data over another uplink physical control channel not carrying URLLC.

14. The terminal device of claim 12, wherein the instructions further cause the terminal device to:
prioritize a uplink physical data channel carrying URLLC related data over another uplink physical data channel not carrying URLLC.

15. The terminal device of claim 12, wherein the instructions further cause the terminal device to:
prioritize a uplink physical data channel carrying URLLC related data over a uplink physical control channel not carrying URLLC.

16. The terminal device of claim 12, wherein the instructions further cause the terminal device to:
set a minimum transmission power for each physical uplink channel of the two or more physical uplink channels, such that transmission power of the physical uplink channel keeps above the minimum transmission power.

17. The terminal device of claim 12, wherein the instructions further cause the terminal device to:
determine from Radio Resource Control, RRC, signaling that at least one logical channel is only allowed to transmit over some carrier or cell; and
identify at least one uplink channel on the carrier or cell as carrying URLLC related data.

18. The terminal device of claim 12, wherein the instructions further cause the terminal device to:
determine from Radio Resource Control, RRC, signaling that at least one logical channel is only allowed to transmit over a specific numerology with low delay; and
identify at least one physical uplink channel which is mapped to the specific numerology as carrying URLLC related data.

19. The terminal device of claim 12, wherein the instructions further cause the terminal device to:
determine from Radio Resource Control, RRC, signaling that at least one logical channel is only allowed to transmit over a Transmission Time Interval, TTI, length less than a predetermined number of Orthogonal Frequency Division Multiplexing, OFDM, symbols; and
identify at least one physical uplink channel which is mapped to the TTI length as carrying URLLC related data.

20. The terminal device of claim 12, wherein the instructions further cause the terminal device to:
   determine from Layer one, L1, grant that a BLock Error Rate, BLER, target bundled to the grant is less than the normal BLER target; and
   identify at least one physical uplink channel using the grant as carrying URLLC related data.

21. The terminal device of claim 12 wherein the at least one physical uplink channel carrying URLLC related data is predefined according to physical resources that the at least one physical uplink channel is mapped to.

22. The terminal device of claim 12, wherein the two or more physical uplink channels comprise a Physical Uplink Control CHannel, PUCCH, and/or one or more Physical Uplink Shared CHannels, PUSCHs.

23. A terminal device for adapting transmission power among two or more physical uplink channels, comprising a transceiver, a processor and a memory, the memory containing instructions executable by the processor whereby the terminal device is operative to perform the method according to claim 1.

* * * * *